April 15, 1941.   E. O. SCHWEITZER, JR   2,238,570
FAULT INDICATING MEANS
Original Filed Aug. 11, 1939
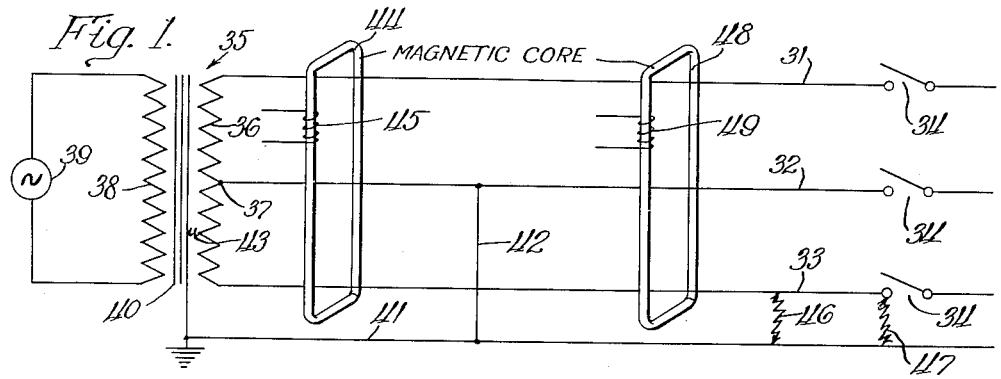
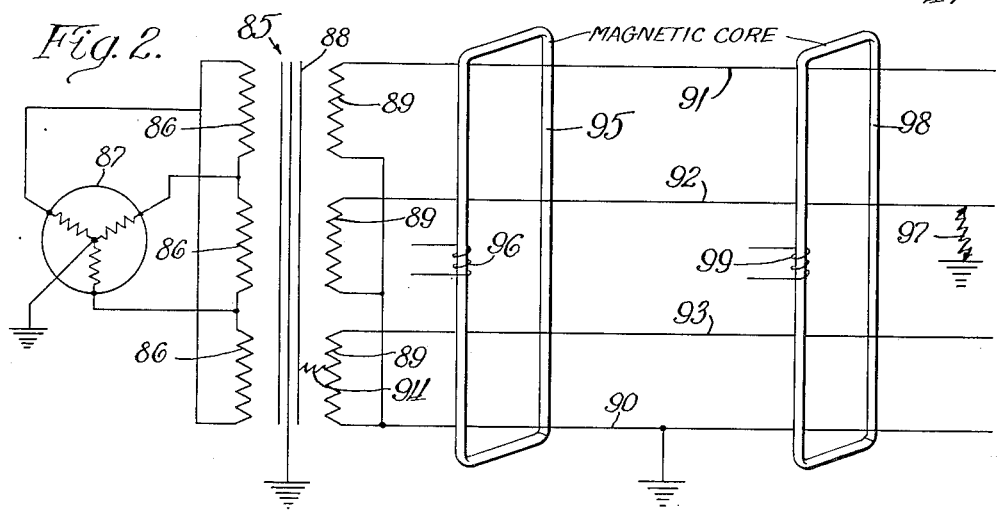
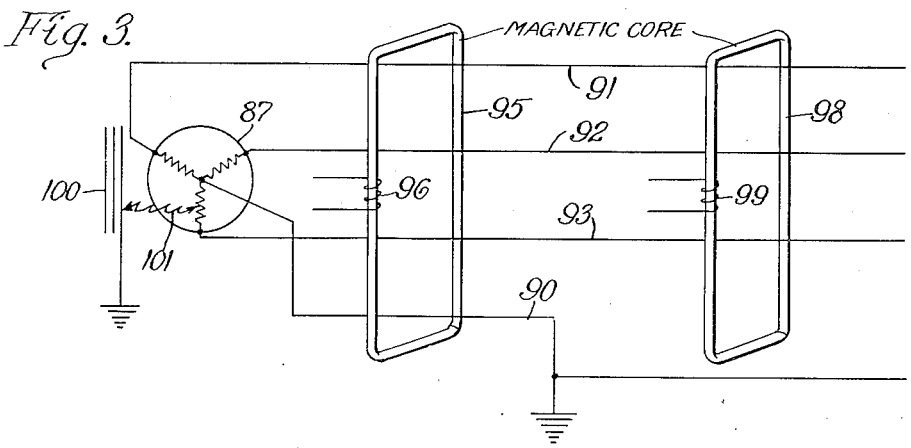
Inventor:
Edmund O. Schweitzer, Jr
By [signature]
Att'ys Patented Apr. 15, 1941

2,238,570

UNITED STATES PATENT OFFICE 2,238,570

FAULT INDICATING MEANS

Edmund O. Schweitzer, Jr., North Brook, Ill.

Original application August 11, 1939, Serial No. 289,600, now Patent No. 2,224,320, dated December 10, 1940. Divided and this application August 21, 1940, Serial No. 353,468

7 Claims. (Cl. 175—294)

My invention relates to apparatus for detecting the presence of fault conditions in an electric power distribution system. This application is a division of my copending application, Serial No. 289,600, filed August 11, 1939, now Patent No. 2,224,320.

An object of my invention is to detect the flow of unbalanced current in a circuit in which the current flow is normally balanced by measuring only the unbalanced current flow.

Another object of my invention is to balance the magnetomotive forces incident to normal current flow in an electric circuit and to measure only the unbalanced magnetomotive forces which are set up under fault conditions when unbalanced current flow takes place.

Other objects of my invention will, in part, be obvious and, in part appear hereinafter.

My invention, accordingly, is disclosed in the embodiments thereof shown in the accompanying drawing, and it comprises the features of construction, combination of elements and arrangement of parts which will be exemplified in the constructions hereinafter set forth, and the scope of the application of which will be indicated in the appended claims.

For a more complete understanding of the nature and scope of my invention, reference may be had to the following detailed description taken in connection with the accompanying drawing, in which:

Figure 1 illustrates diagrammatically how my invention may be employed to detect the occurrence of a fault between the windings of a current source and ground and also between a line conductor and ground; and Figures 2 and 3 illustrate diagrammatically how my invention may be employed in connection with different arrangements of polyphase circuits.

Referring now to Figure 1 of the drawing, it will be observed that conductors 31, 32 and 33 represent a single phase 3-wire system that may be connected by switches 34 to a suitable load circuit. The conductors are energized from a transformer, shown generally at 35, having a secondary winding 36 that is connected to the conductors 31 and 33 and has a center tap 37 which is connected to the conductor 32. The transformer 35 is provided with a primary winding 38 that is connected for energization across a source 39 of alternating current, such as a 60-cycle source. The transformer 35 is provided with a core which is indicated at 40 and which is connected to a ground conductor 41 that parallels the conductors 31, 32 and 33 and is connected by a conductor 42 to the conductor 32.

Assuming now that it is desirable to provide an instantaneous indication of a failure, as indicated at 43 between some of the turns of the secondary winding 36 of the transformer 35 and the core 40 or ground, a magnetic core 44 is provided which completely encircles the conductors 31, 32 and 33. While these conductors are shown, for illustrative purposes, as being spaced relatively far apart, it will be understood that the distances between the conductors 31, 32 and 33 are relatively small as compared to the distances between them and the magnetic core 44.

Under normal operating conditions the fault as indicated at 43 does not exist and the same amount of current that flows outwardly through the conductors 31, 32 and 33 within the core 44 also flows back. Consequently, the magnetomotive forces with respect to the magnetic core 44 are balanced and no flux flows through it. Upon the occurrence of the fault at 43 some current flows through the conductor 41 and consequently the magnetomotive forces applied to the magnetic core 44 are unbalanced and as a result a voltage is induced in the winding 45 thereon. The presence of this voltage then indicates that a fault has occurred and it may be utilized, as will readily be understood, for disconnecting the conductors 31, 32 and 33 and the transformer 35 from the source 39 in a manner such as is disclosed in the application of which this application is a division.

Now assuming that a fault occurs, as indicated at 46, between the conductor 33 and the ground conductor 41 or, as indicated at 47, between the switch 34 and this ground conductor, which may happen on opening of the switch, there would be no voltage induced in the winding 45 on the magnetic core 44 because the magnetomotive forces would be balanced. To take care of this fault condition another magnetic core 48 is provided around the conductors 31, 32 and 33 with the connection of the ground conductor 41 to the conductor 32 being between it and the other magnetic core 44. A winding 49 is provided, as shown, on the magnetic core 48. On the occurrence of either of the faults, as indicated at 46 or 47, the magnetomotive forces applied to the magnetic core 48 will become unbalanced and, as described, a voltage will be induced in the winding 49 which may operate means as described for winding 45.

While, for illustrative purposes, the windings 45 and 49 are shown as being positioned slightly off center with respect to one leg of the cores 44 and 48, it will be understood that they are preferably located in the centers of the legs upon which they are shown.

In Figure 2 of the drawing I have illustrated a system for 3-phase protection which is somewhat similar to the system shown for single phase protection in Figure 1. As shown, a 3-phase transformer, illustrated generally at 85, is provided having delta connected primary windings 86 which are connected for energization to a 3-phase, star connected, grounded neutral generator shown diagrammatically at 87. The transformer 85 is provided with a core 88 and star connected secondary windings 89, the neutral point of which is connected to a ground conductor 90. Circuit conductors 91, 92 and 93 are connected, as shown, to the windings 89.

With a view to indicating the occurrence of a fault, such as the fault 94 between one of the windings 89 and the core 88 of the transformer 85 or to ground, a magnetic core 95 is provided surrounding all of the conductors 90, 91, 92 and 93, which, it will be understood, are positioned in insulated spaced relationship with the distances between them being relatively small as compared to the distances between them and the magnetic core 95. A winding 96 is provided on the core 95 and a voltage will be induced in it on the occurrence of the fault 94, as will now be readily understood.

On the occurrence of a fault, such as indicated at 97, constituting a short circuit to ground from the line conductor 92, there would be no voltage induced in the winding 96 because the magnetomotive forces applied to the core 95 would remain balanced. In order to take care of this fault condition, a core 98 is provided around the conductors 90, 91, 92 and 93 and a winding 99 is positioned thereon. A voltage will be induced in the winding 99 on the occurrence of a fault, such as the fault 97.

Windings 96 and 99 can be connected to suitable means, such as disclosed in the application of which this application is a division, for opening the circuit to clear the fault.

In Figure 3 of the drawing, the conductors 90, 91, 92 and 93 are connected directly to the 3-phase generator 87 without the interposition of the transformer 85. The core of the generator 87 is indicated at 100 and, assuming that a fault occurs, as indicated at 101, between one of the generator windings and the core 100 or ground, then it will be understood that a voltage will be induced in the winding 96 which will indicate the presence of this fault. While the conductor 90 is shown as passing through the magnetic core 95, it will be observed that it does not pass through the magnetic core 98. In the event that the current flow in the conductors 91, 92 and 93 becomes unbalanced so that there is current flow in the neutral conductor 90, then the balanced magnetomotive forces will no longer exist and a voltage will be induced in the winding 99. The balanced condition of the magnetomotive forces will also be upset in the event that there should occur a fault between one of the conductors 91, 92 or 93 and the ground conductor 99 or ground.

Since certain further changes can be made in the above constructions and different embodiments of the invention can be made without departing from the scope thereof, it is intended that all matter contained in the foregoing description or shown in the accompanying drawing shall be interpreted as illustrative and not in a limiting sense.

I claim as my invention:

1. In an electric power distribution system, in combination, a core, a winding on said core energized with alternating current, a load circuit connected across said winding, said core and one conductor of said load circuit being grounded, a magnetic circuit surrounding said load circuit into which flux is induced on the occurrence of a short circuit between said winding and said core, the distance between the conductors forming said load circuit being relatively small as compared to the distance between said conductors and said magnetic circuit, and means linking said magnetic circuit and responsive to said flux induced therein.

2. In an electric power distribution system, in combination, a core, a winding on said core energized with alternating current, a load circuit connected across said winding, said core and one conductor of said load circuit being grounded, a magnetic circuit surrounding said load circuit, the distance between the conductors forming said load circuit being relatively small as compared to the distance between said conductors and said magnetic circuit, the ground on said one conductor being between said winding and said magnetic circuit whereby flux is induced in the latter only on flow of short circuit current in said load circuit to ground beyond said magnetic circuit, and means linking said magnetic circuit and responsive to said flux induced therein.

3. In an electric power distribution system, in combination, a core, a winding on said core energized with alternating current, a load circuit connected across said winding, said core and one conductor of said load circuit being grounded, a magnetic circuit surrounding said load circuit into which flux is induced on the occurrence of a short circuit between said winding and said core, another magnetic circuit surrounding said load circuit, the distance between the conductors forming said load circuit being relatively small as compared to the distance between said conductors and said magnetic circuits, the ground on said one conductor being between said magnetic circuits whereby flux is induced in said other magnetic circuit only on flow of short circuit current in said load circuit to ground beyond said other magnetic circuit, and winding means linking said magnetic circuits in which a voltage or voltages are generated as a result of induction of flux in said magnetic circuits on flow of short circuit current on the occurrence of either or both of the aforesaid fault conditions.

4. In an electric power distribution system, in combination, core means, windings on said core means energized with polyphase alternating current, a load circuit including a plurality of line conductors and a neutral conductor connected to said windings, said core and neutral conductor being grounded, a magnetic circuit surrounding said load circuit into which flux is induced on the occurrence of a short circuit between any of said windings and said core means, the distances between the conductors forming said load circuit being relatively small as compared to the distances between said conductors and said magnetic circuit, and means linking said magnetic circuit and responsive to said flux induced therein.

5. In an electric power distribution system, in combination, core means, windings on said core means energized with polyphase alternating current, a load circuit including a plurality of line conductors and a neutral conductor connected to said windings, said core and neutral conductor being grounded, a magnetic circuit surrounding said load circuit, the distances between the conductors forming said load circuit being relatively small as compared to the distances between said conductors and said magnetic circuit, the ground on said neutral conductor being between said windings and said magnetic circuit whereby flux is induced into the latter only on flow of short circuit current in said load circuit to ground beyond said magnetic circuit, and means linking said magnetic circuit and responsive to said flux induced therein.

6. In an electric power distribution system, in combination, core means, windings on said core means energized with polyphase alternating current, a load circuit including a plurality of line conductors and a neutral conductor connected to said windings, said core and neutral conductor being grounded, a magnetic circuit surrounding said load circuit into which flux is induced on the occurrence of a short circuit between any of said windings and said core means, another magnetic circuit surrounding said load circuit, the distances between the conductors forming said load circuit being relatively small as compared to the distances between said conductors and said magnetic circuits, the ground on said neutral conductor being between said magnetic circuits whereby flux is induced into said other magnetic circuit only on flow of short circuit current in said load circuit to ground beyond said other magnetic circuit, and winding means linking said magnetic circuits in which a voltage or voltages are generated as a result of induction of flux in said magnetic circuits on flow of short circuit current on the occurrence of either or both of the aforesaid fault conditions.

7. In an electric power distribution system, in combination, core means, windings on said core means energized with polyphase alternating current, a load circuit including a plurality of line conductors and a neutral conductor connected to said windings, said core and neutral conductor being grounded, a magnetic circuit surrounding said line conductors into which flux is induced on the occurrence of unbalanced current flow in said line conductors, the distances between said line conductors being relatively small as compared to the distances between said line conductors and said magnetic circuit, and means linking said magnetic circuit and responsive to said flux induced therein.

EDMUND O. SCHWEITZER, Jr.